United States Patent [19]

Atlas

[11] Patent Number: 5,042,753
[45] Date of Patent: Aug. 27, 1991

[54] MECHANICAL STABILIZATION SYSTEM HAVING COUNTER-ROTATING ROTORS WHICH ARE SEPARATE

[75] Inventor: Gérard Atlas, Saint Marcel, France

[73] Assignee: Societe Europeenne de Propulsion, Suresnes, France

[21] Appl. No.: 470,614

[22] Filed: Jan. 26, 1990

[30] Foreign Application Priority Data

Jan. 31, 1989 [FR] France .................. 89 01217

[51] Int. Cl.⁵ .................. B64G 1/28; B64G 1/44; H02K 16/00
[52] U.S. Cl. .................. 244/165; 310/114; 244/158 R; 244/173
[58] Field of Search .......... 244/164, 165, 171, 158 R, 244/173; 310/112, 114; 343/715, 903

[56] References Cited

U.S. PATENT DOCUMENTS

| | | | |
|---|---|---|---|
| 3,341,151 | 9/1967 | Kampinsky | 244/158 |
| 4,219,107 | 8/1980 | Ford | 244/173 |
| 4,230,294 | 10/1980 | Pistiner | 244/171 |
| 4,723,735 | 2/1988 | Eisenhaure et al. | 244/165 |

FOREIGN PATENT DOCUMENTS

| | | | |
|---|---|---|---|
| 2829432 | 1/1980 | Fed. Rep. of Germany | 244/165 |
| WO86/00863 | 2/1986 | World Int. Prop. O. | |
| WO87/00654 | 1/1987 | World Int. Prop. O. | |
| WO88/10459 | 12/1988 | World Int. Prop. O. | |

OTHER PUBLICATIONS

"A Reactionless Precision Pointing Actuator", P. Wiktor, pp. 165–175, May 1, 1987, Aerospace Mechanism Symposium.

Primary Examiner—Joseph F. Peters, Jr.
Assistant Examiner—Linda L. Palomar
Attorney, Agent, or Firm—Weingarten, Schurgin, Gagnebin & Hayes

[57] ABSTRACT

The system for stabilizing a support to be stabilized comprises a working rotor mounted on the support via bearings and fixed to a working member having at least one parameter associated with the rotation of the working rotor and which is variable as a function of time. A servo-controlled first electric motor is interposed between the support and the working rotor and serves to rotate the working rotor in a first direction. A reaction rotor is mounted on the support by means of bearings and independently from the working rotor, while being coaxial therewith. The reaction rotor supports a reaction inertia member, and a servo-controlled second electric motor is interposed between the reaction rotor and the support in order to rotate the reaction rotor in the opposite direction to the working rotor and at a higher speed so as to cancel the disturbances applied to the support by the working rotor, with the mass of the rotary assembly associated with the reaction rotor being less than the mass of the rotary assembly associated with the working rotor.

5 Claims, 2 Drawing Sheets

MECHANICAL STABILIZATION SYSTEM HAVING COUNTER-ROTATING ROTORS WHICH ARE SEPARATE

The present invention relates to a mechanical stabilization system having counter-rotating rotors which are separate, the system comprising a support to be stabilized, a working rotor mounted on the support by bearings and fixed to a working member for which at least one parameter associated with the rotation of the working rotor is variable as a function of time, a first motor interposed between the support and the working rotor in order to drive the working rotor, the first motor having wound pole pieces fixed to the support, a detector interposed between the working rotor and the support in order to measure said parameter associated with the rotation of the working rotor and on which a predetermined law of motion is to be imposed as a function of time, and a first servo-control circuit receiving signals from the first detector in order to change the operating characteristics of the first motor in such a manner as to ensure that the said predetermined law of motion for the working rotor is complied with.

BACKGROUND OF THE INVENTION

Rotary systems having at least one parameter such as position, speed, torque, or acceleration which is servo-controlled as a function of time, tend to disturb the support on which they are mounted by a reaction effect. Such disturbances can generally be considered as being negligible when the support has considerable mass, e.g. a large ship. In contrast, the disturbances become significant and require compensating when the mass of the support is relatively small or when the position of the support must be maintained very accurately. This applies in particular to satellites which are required to conserve a well-defined attitude in orbit or which are subjected to the constraints of microgravity: the systems embarked on the satellite such as systems for rotating an antenna or solar panels at a non-constant speed tend to disturb the stability of the satellite unacceptably in the absence of stabilization systems.

In a paper entitled "A Reactionless Precision Pointing Actuator" given by Peter Wiktor at the "Aerospace Mechanism Symposium" held in Houston in May 1987, proposals are made to provide a control system for a gyroscopic platform which simultaneously ensures stabilization so as to prevent a reaction torque appearing on the platform support which is constituted by a spacecraft or satellite. In order to ensure decoupling between the motion of the gyroscopic platform and the attitude control of the spacecraft, counter-rotating motion is imparted to a reaction wheel incorporated in the gyroscopic platform and provided with a shaft which is coaxial with the shaft of the gyroscopic platform and which is rotated in the opposite direction thereto by means of an electric motor for the reaction wheel, having its stator mounted on the gyroscopic platform and its rotor fixed to said coaxial shaft. A direct drive second motor has its stator fixed to the support and its rotor fixed to the axis of the gyroscopic platform and serves both to drive the gyroscopic platform so as to cause it to take up an angular position or a speed of rotation as a function of a predetermined law, and also to compensate for interferring torque due to friction in the bearings or to the presence of electricity power cables which prevent angular rotations through more than $2\pi$ radians. The servo-control circuit associated with the electric motor for the reaction wheel has a passband situated in a higher range of frequencies than the passband of the servo-control circuits associated with the direct drive motor.

The embodiment described in the above-mentioned paper uses two electric motors of non-negligible power, thereby increasing both mass and energy consumption, and in addition it is not suitable for applications in which the working rotary member is required to rotate through several turns.

In addition, providing rotors which are nested in one another can turn out to be quite complex in certain circumstances when account is taken of problems posed by stacking concentric elements and by the backlash existing in the bearings disposed between the various concentric elements.

The present invention seeks to remedy the above-mentioned drawbacks and to provide a mechanical stabilization device which is more convenient to implement, more accurate, more compact, and which enlarges the range of possible applications.

SUMMARY OF THE INVENTION

These aims are achieved by a mechanical stabilization system having counter-rotating rotors which are separate, the system comprising a support to be stabilized, a working rotor mounted on the support by bearings and fixed to a working member for which at least one parameter associated with the rotation of the working rotor is variable as a function of time, a first motor interposed between the support and the working rotor in order to drive the working rotor, the first motor having wound pole pieces fixed to the support, a detector interposed between the working rotor and the support in order to measure said parameter associated with the rotation of the working rotor and on which a predetermined law of motion is to be imposed as a function of time, and a first servo-control circuit receiving signals from the first detector in order to change the operating characteristics of the first motor in such a manner as to ensure that the said predetermined law of motion for the working rotor is complied with, wherein the system includes a reaction rotor which is mounted on the support by means of bearings independently from the working rotor while being coaxial therewith, and which supports a reaction inertia member, a second motor interposed between the reaction rotor and the support and including wound pole pieces fixed to the support, a second detector interposed between the reaction rotor and the support, a second servo-control circuit, synchronous with the first servo-control circuit, and receiving signals from the second detector in order to control the second motor in such a manner as to cancel the disturbances applied to the support by the working rotor, wherein the total mass of the reaction rotor, of the reaction inertia member, of the second motor, and of the corresponding bearings is less than the total mass of the working rotor, of the working member, of the first motor, and of the corresponding bearings, and wherein the reaction rotor is rotated by the second motor at a speed which is greater than that of the working rotor.

In a first possible embodiment, the working rotor and the reaction rotor are independently mounted on the support by means of respective bearings and they are kept in alignment by means of a one-piece sleeve fixed to the support and on which all of the bearings are mounted.

In another possible embodiment, the working rotor and the reaction rotor are independently mounted on the support by respective bearings and are kept in alignment by means of two sleeves which are connected together by engaging flanges which are also fixed to the support, with the bearings for supporting the working rotor and the reaction rotor being mounted in respective ones of said sleeves.

The presence of a reaction rotor which is independent from the working rotor but which is maintained coaxial with the working rotor simplifies implementing the rotary assembly and makes it easy to use two motors whose wound pole pieces are fixed to the support and which are servo-controlled from independent servo-control circuits so that there is no constraint on the extent to which the rotors may rotate, e.g. due to connection wires. Further, by using a reaction rotor which is small in mass but which rotates at a higher speed than the working rotor, it is possible to limit the power required by the second motor for driving the reaction rotor and thus to limit the overall mass of the reaction members used for stabilizing the support.

In a particular embodiment, the working rotor and the reaction rotor are coaxially nested in part, the reaction rotor is mounted inside the working rotor, with the second motor being interposed between the support and the reaction rotor in a cantilevered portion of said reaction rotor, and the bearings supporting the reaction rotor are mounted on the working rotor whose own bearings are mounted on the support to be stabilized in such a manner as to define a rotary assembly of reduced bulk.

In this case, the reaction rotor is connected to the support via the working rotor, but the motion of the reaction rotor remains under independent control of the second electric motor whose wound pole pieces are fixed directly on the support.

The invention may be applied to various rotary assemblies mounted on support structures on land, at sea, in the air, underwater, and in space, either with or without gravity forces being present.

In a particularly advantageous application, the support is constituted by a satellite or a space station, and the working member mounted on the working rotor is constituted by a rotary member such as an antenna or a solar panel.

BRIEF DESCRIPTION OF THE DRAWINGS

Embodiments of the invention are described by way of example with reference to the accompanying drawings, in which.

DETAILED DESCRIPTION

Figure 1:
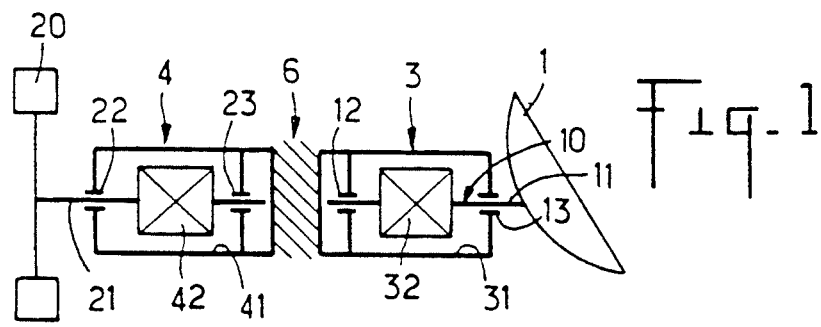
FIG. 1 is a diagram of a first embodiment of a mechanical stabilization system having counter-rotating rotors which are separate, using a main electric motor acting on the working rotor and a secondary electric motor acting on the reaction rotor.

FIG. 1 is a diagram of a rotary assembly comprising a working rotor 10 connected via a shaft 11 which extends the working rotor 10 axially to a working member 1 such as an antenna, for example, for which angular position or some other parameter related to rotation of the working rotor 10, e.g. torque, acceleration, or angular velocity, is to be permanently adjusted in accordance with a predetermined law without transmitting disturbances to a support 6 on which the working rotor 10 is mounted, e.g. via the shaft 11 and by means of bearings 12 and 13, e.g. ball bearings.

In order to enable motion of the working rotor 10 to be controlled without disturbing the support 6, which may be constituted by a satellite of relatively low mass, for example, a reaction rotor 21 having a reaction inertia member 20 attached thereto is mounted on the support 6 by means of bearings 22 and 23 which may be ball bearings, and is subjected to actively-controlled motion in the opposite direction to the working rotor 10 and of a magnitude such that the support 6 is not subjected to disturbance generated by the various moving members, i.e. the support senses no variation in overall angular momentum.

In accordance with the present invention, a first electric motor 3 servo-controlled by first electronic servo-control circuits (not shown in the drawing) is interposed between the working rotor 10 and the support 6 and contributes to imparting rotary motion to the working rotor 10 and to the working member 1 under the control of time-varying predetermined variable motion parameters. A second electric motor 4 servo-controlled by second servo-control circuits (not shown in the figures) serves to drive the reaction rotor 21 and consequently the reaction member 20 in the opposite direction to the working rotor 10. By virtue of the servo-controlled motors 3 and 4, the working rotor 10 and the reaction rotor 21 are driven relative to the support 6 in opposite directions at speeds whose magnitudes are in a ratio determined by the need for the angular momentum acquired by each of the rotors 10 and 20 to be equal to that acquired by the other so that the total angular momentum remains zero.

A detector 33 (shown only in FIGS. 3 to 5) is interposed between the working rotor 10 and the support 6. This detector measures a parameter (e.g. speed, torque, or acceleration) associated with the motion of the working rotor 10 and which is to be subjected to a predetermined law as a function of time. The value of this parameter as measured by the detector 33 is transmitted to the servo-control circuits which modify the appropriate operating characteristics of the motor 3 in such a manner as to ensure that the working rotor 10 obeys the predetermined law of motion. Whatever this law may be, the rotation of the reaction rotor 21 prevents any disturbance from being transmitted to the support 6.

A detector 44 (shown only in FIGS. 3 to 5) is interposed between the support 6 and the reaction rotor 21 (FIGS. 3 to 5) in order to provide information to the servo-control circuits associated with the second electric motor 4, which servo-control circuits are synchronous with the servo-control circuits for the main motor 3.

Figure 3:
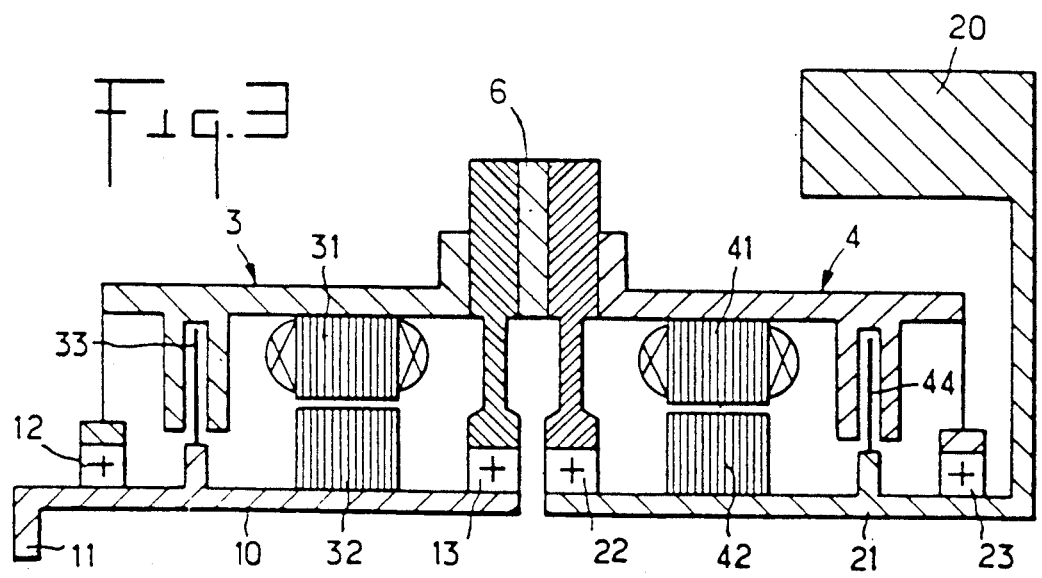
FIG. 3 is an axial half-section through a mechanical stabilization system in accordance with the embodiment shown in FIG. 1, comprising a separate working rotor and reaction rotor.
Figure 4:
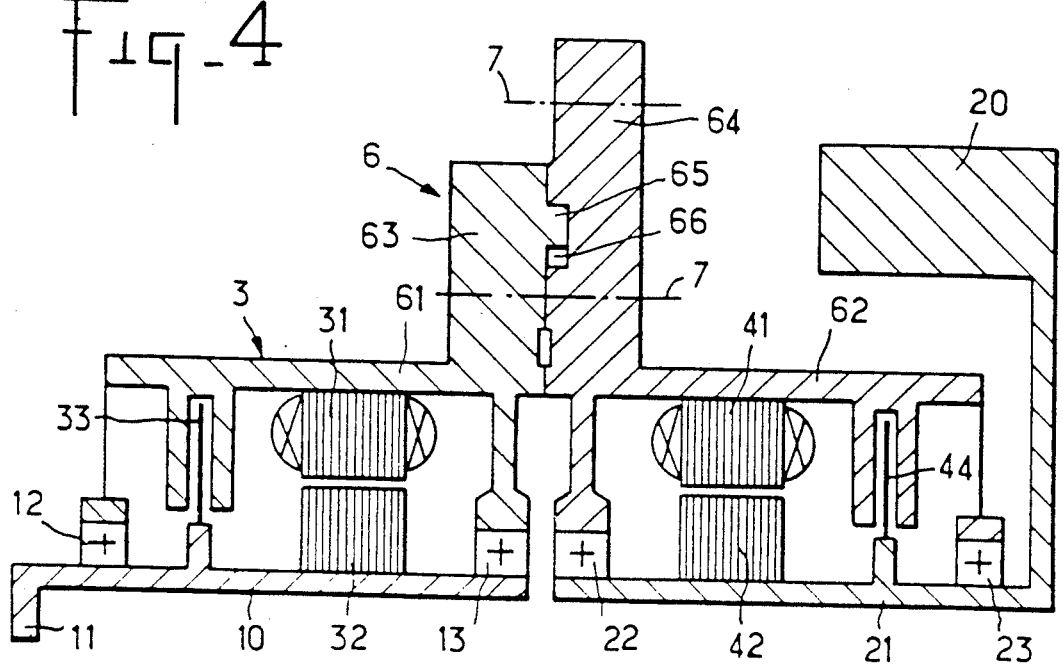
FIGS. 4 and 5 are axial half-sections showing variants of the FIG. 3 stabilization system in which special means are provided for ensuring that the working rotor and the reaction rotor are kept in alignment.
Figure 5:
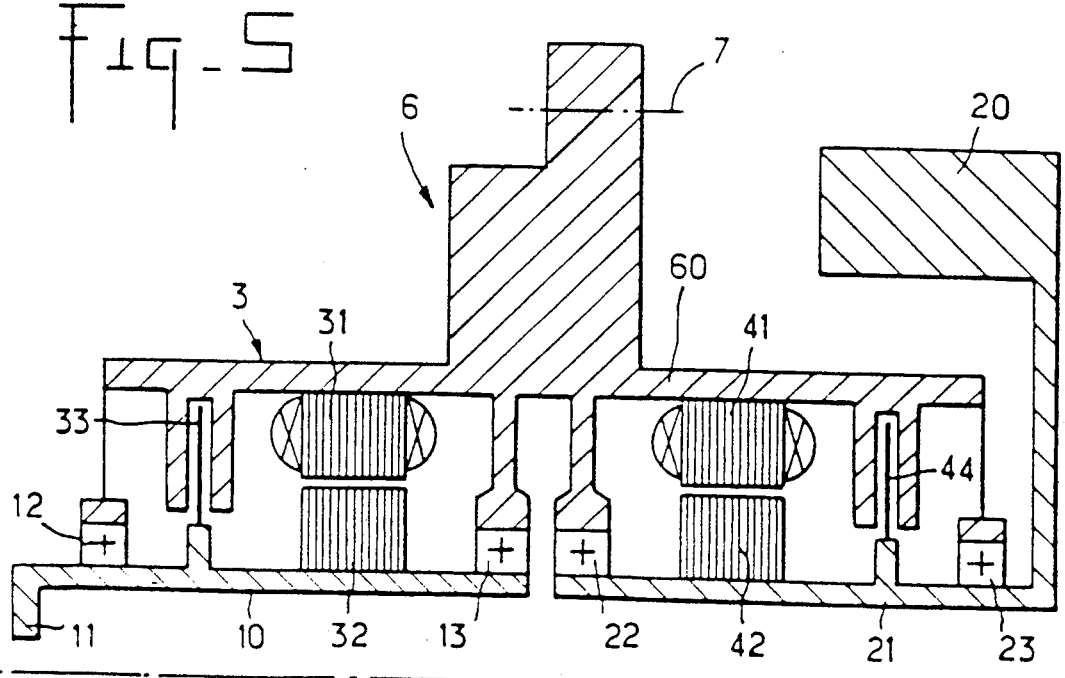

As an be seen in FIGS. 3 to 5, each electric motor 3, 4 comprises a winding-free rotating armature 32, 42 mounted on the corresponding rotor 10, 21, together with pole pieces 31 and 41 which are provided with windings and which are fixed on the support 6. As a result, the connections between the electrical power supplies and the motors 3 and 4 can be greatly simplified and provided by static conductors, with there being no limit on the amplitude of rotation of either of the rotors due to connection wires.

Thus, the maximum positive or negative angles through which the working rotor 10 and the reaction rotor 21 may rotate are practically unlimited and may constitute a large number of rotations.

This makes it possible, for example, to take account of cases where the working rotor 10 reaches considerable amplitudes on either side of a mean zero value, or arbitrary amplitudes on either side of a non-zero mean value, said amplitudes being a function of the mission to be accomplished by the working inertia of the working member 1 fixed to the working rotor 10.

The invention is particularly applicable to cases where the moment of inertia JA of the reaction rotor 21 is substantially less than the moment of inertia JU of the working rotor 10, thereby requiring the reaction rotor 21 to rotate through considerable amplitudes which may reach a large number of rotations.

In generation, although not shown in the drawings for reasons of clarity, the reaction rotor 21 and the reaction inertia member 20 constitute, together with the armature 42 of the motor 4 and the bearings 22 and 23, a rotary assembly whose mass is substantially less than that of the rotary assembly constituted by the working rotor 10, the working member 1, the armature 32 of the motor 3, and the bearings 12, 13, thereby making it possible to use a motor 4 which is considerably smaller than the motor 3, and thus avoid significantly increasing the overall mass of the system. Naturally, in order to ensure that the overall angular momentum of the system remains zero, the speed of rotation of the reaction rotor 21 must be higher than that of the working rotor 10.

FIG. 4 shows an embodiment in which the working rotor 10 and the reaction rotor 21 are independently mounted via respective pairs of bearings 12 and 13 and 22 and 23 on the support 6 and in which they are kept in alignment by two sleeves 61 and 62 which are interconnected by flanges 63 and 64 that engage each other by a system of pegs, e.g. comprising tenons 65 and mortises 66, with the flanges 63 and 64 being fixed in turn to the body of the support 6 (not shown) by conventional fixing means 7. The bearings 12 and 13 and 22 and 23 for supporting the working rotor 10 and the reaction rotor 21 are respectively mounted on the sleeves 61 and 62, and the rotors 10 and 21 are kept accurately coaxial while nevertheless retaining convenience in assembly and control of the rotors 10 and 21 and their associated motors 3 and 4 which continue to be independent.

FIG. 5 shows a variant embodiment that seeks to achieve the same advantages as the embodiment shown in FIG. 4 with respect to ensuring that the rotors 10 and 21 remain coaxial. In this case, the working rotor 10 and the reaction rotor 21 which are independently mounted by means of respective pairs of bearings 12 and 13 and 22 and 23 on the support 6 are kept in alignment by a one-piece sleeve 60 which is fixed to the body of the support 6 (not shown) by connection means 7 and which has the sets of bearings 12 and 13 and 22 and 23 mounted thereon.

Figure 2:
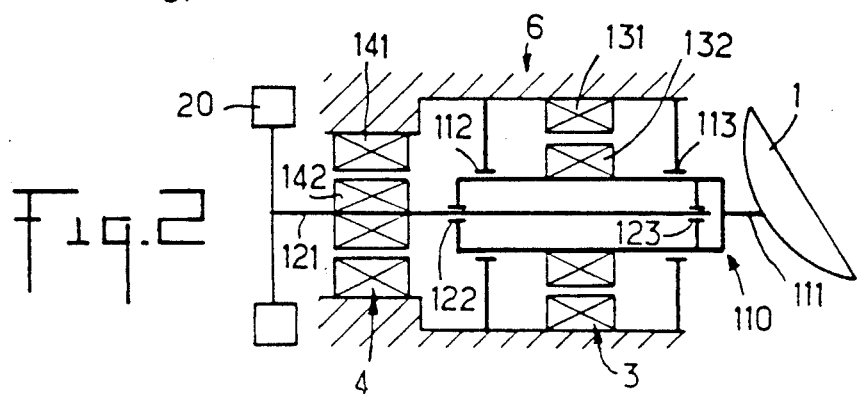
FIG. 2 is a diagram of a second embodiment of a counter-rotating mechanical stabilization system in which a working rotor and a reaction rotor are partially nested and in which each of them is driven separately by its own servo-controlled electric motor.

FIG. 2 relates to a second embodiment of the invention in which the working rotor 110, 111 and the reaction rotor 121 to which the working member 1 and the reaction inertia member 20 are respectively connected are driven by respective motors 3 and 4 having respective rotating winding-free armatures 132 and 142 fixed respectively to the working rotor 110 and to the reaction rotor 121, and respective wound pole pieces 131 and 141 mounted on the support 6. By using two separate electric motors 3 and 4 each mounted between the support 6 and one of the rotors 110 and 121, and servo-controlled by independent but synchronous servo-control circuits, and each receiving signals from respective detectors 33 and 34 for detecting the angular positions of the corresponding rotors 110 and 121 relative to the support 6, it is possible to benefit from the advantages mentioned above with respect, in particular, to supplying power to the electric motors 3 and 4. In the embodiment shown in FIG. 2, as in the embodiments shown in the other figures, the reaction rotor 121, the associated reaction inertia member 20, and the rotary armature 142 have much lower inertia than the working rotor 110, the working member 1, and the rotary armature 132, and they therefore rotate at a higher speed than the working rotor 110.

The embodiment shown in FIG. 2 is more compact than the embodiments shown in FIGS. 1 and 3 to 5 insofar as while still co-operating with a motor 4 whose stator 141 is mounted on the support 6, the reaction rotor 121 is partially nested inside the working rotor 110 and is mounted inside it by means of bearings 122 and 123, with the motor 4 and the reaction inertia member 20 being cantilevered on the reaction rotor 121. The working rotor 110 is itself mounted on the support 6 as in the other embodiments by means of bearings 112 and 113 which may be ball bearings, for example, but which could also be constituted by magnetize bearings or by gas bearings, as could the bearings in the other embodiments.

I claim:

1. A mechanical stabilization system having counter-rotating rotors which are separate, the system comprising a support to be stabilized, a working rotor mounted on the support by bearings and fixed to a working member for which at least one parameter associated with the rotation of the working rotor is variable as a function of time, a first motor interposed between the support and the working rotor in order to drive the working rotor, the first motor having wound pole pieces fixed to the support, a detector interposed between the working rotor and the support in order to measure said parameter associated with the rotation of the working rotor and on which a predetermined law of motion is to be imposed as a function of time, and a first servo-control circuit receiving signals from the first detector in order to change the operating characteristics of the first motor in such a manner as to ensure that the said predetermined law of motion for the working rotor is complied with, wherein the system includes a reaction rotor which is mounted on the support by means of bearings independently from the working rotor while being coaxial therewith, and which supports a reaction inertia member, a second motor interposed between the reaction rotor and the support, a second servo-control circuit, synchronous with the first servo-control circuit, and receiving signals from the second detector in order to control the second motor in such a manner as to cancel the disturbances applied to the support by the working rotor, wherein the total mass of the reaction rotor, of the reaction inertia member, of the second motor, and of the corresponding bearings is less than the total mass of the working rotor, of the working member, of the first motor, and of the corresponding bearings, and wherein the reaction rotor is rotated by the second motor at a speed which is greater than that of the working rotor.

2. A system according to claim 1, wherein the working rotor and the reaction rotor are independently mounted on the support by means of respective bearings and they are kept in alignment by means of a one-piece sleeve fixed to the support and on which all of the bearings are mounted.

3. A system according to claim 1, wherein the working rotor and the reaction rotor are independently mounted on the support by respective bearings and are kept in alignment by means of two sleeves which are connected together by engaging flanges which are also fixed to the support, with the bearings for supporting the working rotor and the reaction rotor being mounted in respective ones of said sleeves.

4. A system according to claim 1, wherein the working rotor and the reaction rotor are coaxially nested in part, wherein the reaction rotor is mounted inside the working rotor, with the second motor being interposed between the support and the reaction rotor in a cantilevered portion of said reaction rotor, and wherein the bearings supporting the reaction rotor are mounted on the working rotor whose own bearings are mounted on the support to be stabilized in such a manner as to define a rotary assembly of reduced bulk.

5. A system according to claim 1, wherein the support is constituted by a spacecraft, and the working member mounted on the working rotor is constituted by a rotary member such as an antenna.

* * * * *

UNITED STATES PATENT AND TRADEMARK OFFICE
CERTIFICATE OF CORRECTION

PATENT NO. : 5,042,753
DATED : August 27, 1991
INVENTOR(S) : Gérard Atlas

It is certified that error appears in the above-identified patent and that said Letters Patent is hereby corrected as shown below:

Column 5, line 26, "In generation, although not shown" should read --In general, although not shown--.

Signed and Sealed this

Thirtieth Day of March, 1993

Attest:

STEPHEN G. KUNIN

Attesting Officer

Acting Commissioner of Patents and Trademarks